US012290789B2

(12) United States Patent
Baudtler et al.

(10) Patent No.: US 12,290,789 B2
(45) Date of Patent: May 6, 2025

(54) CARBONATOR FOR PRODUCING CARBONATED BEVERAGE

(71) Applicant: AARKE AB, Stockholm (SE)

(72) Inventors: Rasmus Baudtler, Stockholm (SE); Erik Wahlin, Värmdö (SE)

(73) Assignee: AARKE AB, Stockholm (SE)

( * ) Notice: Subject to any disclaimer, the term of this patent is extended or adjusted under 35 U.S.C. 154(b) by 393 days.

(21) Appl. No.: 17/905,322

(22) PCT Filed: Mar. 3, 2021

(86) PCT No.: PCT/EP2021/055227
§ 371 (c)(1),
(2) Date: Aug. 30, 2022

(87) PCT Pub. No.: WO2021/175876
PCT Pub. Date: Sep. 10, 2021

(65) Prior Publication Data
US 2023/0146835 A1 May 11, 2023

(30) Foreign Application Priority Data
Mar. 6, 2020 (SE) .................................. 2050254-8

(51) Int. Cl.
*B01F 23/2361* (2022.01)
*B01F 23/236* (2022.01)
(Continued)

(52) U.S. Cl.
CPC ...... *B01F 23/2364* (2022.01); *B01F 23/2361* (2022.01); *B01F 23/237621* (2022.01); *B01F 35/602* (2022.01); *B01F 2101/14* (2022.01)

(58) Field of Classification Search
CPC .............. B01F 23/2361; B01F 23/2364; B01F 23/237621; B01F 35/602; B01F 2101/14
(Continued)

(56) References Cited

U.S. PATENT DOCUMENTS 3,752,452 A * 8/1973 Iannelli ............ B01F 35/71805 261/DIG. 7
4,950,431 A * 8/1990 Rudick ............ B01F 23/23124 261/60
(Continued)

FOREIGN PATENT DOCUMENTS

CN 204218672 U 3/2015
DE 10140098 A1 * 4/2003
(Continued)

OTHER PUBLICATIONS

English Machine Translation of DE 10140098 A1 (Year: 2003).*
(Continued)

*Primary Examiner* — Charles S Bushey
(74) *Attorney, Agent, or Firm* — Knobbe Martens Olson & Bear LLP

(57) ABSTRACT

A carbonator (100) for producing carbonated beverage including a first connector (11) for a gas-outlet (105) of a CO2-container (104) and with a CO2-valve (12), operable between a closed state and an open state, a second connector, a venting valve, an operating mechanism, and a manipulator (103), coupled to the operating mechanism (80), for allowing a person to operate the operating mechanism (80) between: a start mode (I) in which the venting valve (40) is open and the CO2-valve (12) is closed, and an end mode (III) in which the CO2-valve (12) is open and the venting valve (40) is closed, whereby the operating mechanism (80) is configured to be set in an intermediate mode (II), between the start mode (I) and the end mode (III), in which both the venting valve (40) and the CO2-valve (12) are closed.

17 Claims, 7 Drawing Sheets

(51) Int. Cl.

| | |
|---|---|
| ***B01F 23/237*** | (2022.01) |
| ***B01F 35/60*** | (2022.01) |
| *B01F 101/14* | (2022.01) |

(58) Field of Classification Search

USPC .................................................... 261/DIG. 7

See application file for complete search history.

(56) References Cited

U.S. PATENT DOCUMENTS

| | | | | |
|---|---|---|---|---|
| 5,870,944 | A | 2/1999 | Vander Zalm et al. | |
| 6,017,021 | A * | 1/2000 | Yiu | B67D 1/0412 261/DIG. 7 |
| 6,036,054 | A * | 3/2000 | Grill | B01F 35/712 261/DIG. 7 |
| 10,058,826 | B2 * | 8/2018 | Cohen | A23L 2/54 |
| 2017/0241701 | A1 | 8/2017 | Lee et al. | |

FOREIGN PATENT DOCUMENTS

| | | | |
|---|---|---|---|
| EP | 2 226 539 | A1 | 9/2010 |
| SE | 0950129 | A1 | 9/2010 |
| WO | WO 2013/124236 | A1 | 8/2013 |
| WO | WO 2015/144639 | A1 | 10/2015 |
| WO | WO 1997025130 | A1 | 7/2017 |

OTHER PUBLICATIONS

International Search Report for International Application No. PCT/EP2021/055227 dated Jun. 15, 2021.

Swedish Search Report for Swedish Patent Application No. 2050254-8 dated Sep. 9, 2022.

Office Action for Chinese Application No. 2021800190803 dated Aug. 9, 2023.

* cited by examiner

Closed

Intermediate - Closed

Open

Open

Intermediate - Closed

Closed

CARBONATOR FOR PRODUCING CARBONATED BEVERAGE

CROSS REFERENCE TO RELATED APPLICATION

This application is a U.S. National Phase Application of PCT International Application Number PCT/EP2021/055227, filed on Mar. 3, 2021, designating the United States of America and published in the English language. The disclosure of the above-referenced application is hereby expressly incorporated by reference in its entirety.

TECHNICAL FIELD

The present disclosure relates to a carbonator for producing carbonated beverage, such as carbonated water.

BACKGROUND ART

Carbonators are used for producing carbonated beverage, such as carbonated water. Carbonators for domestic use are typically designed to be placed on a table or bench and are operated manually by a person or user. Such a carbonator, a.k.a. a soda water machine, typically comprises a carbon dioxide bottle, which is connected to a nozzle which is inserted into a water bottle that contains liquid. The carbonator further comprises an operating arrangement, which allows the user to open a valve in the carbon dioxide bottle to introduce carbon dioxide into the water bottle. The carbon dioxide dissolves in the liquid in the water bottle (under pressure). The operating arrangement typically comprises a lever, or button, to be maneuvered by the user as well as tubes and various valves to regulate the pressure of carbon dioxide in the water bottle.

The known carbonators are marred with various drawbacks and problems.

For example, the Chinese utility model CN 204218672 U shows a carbonator with a water bottle 1 and a carbon dioxide bottle 2 which is connected to the water bottle via an opening valve 7. The carbonator further has a first release valve 13 for releasing excess pressure from the water bottle 1 after completed carbonation. The release valve 13 and the opening valve 7 of the carbon dioxide bottle are connected by a bridge 8 to ensure that the release valve 13 is open when the opening valve 7 of the carbon dioxide bottle is closed. Thereby, it is ensured that the bottle is vented prior to removal. Operation of the carbonator is achieved by a lever, which is connected to the bridge 8 via a complicated and voluminous mechanism that includes toothed wheels 20, 21 and linkage arms 23. In use, a person may open the opening valve 7 by actuating the lever whereby carbon dioxide gas is released from the carbon dioxide bottle 2 and is dissolved in the water bottle. A second release valve 15 is arranged to open with a buzz-sound when a predetermined pressure of 6-8 bar is achieved in the water bottle. The person then releases the lever, which causes the operating mechanism to close the opening valve 7 and open the first release valve 13 so that the water bottle 1 is vented through pipe 34.

Typically, some persons like their beverage lightly sparkling while others like to have their beverage strongly carbonated. To dissolve more carbon dioxide in the liquid contained in the water bottle, a person may actuate the lever again so that a further carbonation cycle is performed.

However, in the above described carbonator the water bottle is vented between each carbonation cycle and this causes a high carbon dioxide consumption when repeated carbonation cycles are performed.

The Swedish patent application SE 0950129 A1 describes a carbonator which aims at reducing the carbon dioxide consumption during repeated carbonation cycles. To achieve this aim, the carbonator comprises a special valve 14 which is arranged in the water bottle 1 and that is actuated by an operating mechanism 12, which connected to an opening valve 7 of the carbon dioxide bottle 6 and to the valve 14. The valve 14 comprises a valve piston 16 and a spring 22 and a maneuver element 21, which may be actuated by the operating mechanism 12. During a carbonation cycle, the valve 14 works or otherwise operates as an overpressure valve as long as the operating mechanism 12 bears on the maneuver element 21. When the operating mechanism 12 is released from the maneuver element 21, the spring factor of the spring 22 is changed and the valve 14 becomes a release valve through which the water bottle 1 is vented until the operating mechanism 12 is actuated again. Consequently a drawback with the carbonator of SE 0950129 A1 is that, between two carbonation cycles, carbon dioxide is lost from the water bottle through the venting valve. Also, the operating mechanism 12 of the carbonator of SE 0950129 A1 involves a rather complicated cogwheel-rack construction which is voluminous and may jam easily.

SUMMARY OF THE INVENTION

It is in view of the above background and other considerations that the various embodiments of the present invention have been made.

Thus, it is an object of the present disclosure to present an improved carbonator for producing carbonated beverage, which solves at least one of the above problems.

In detail, it is an object of the present disclosure to present a carbonator that allows for repeated carbonation cycles with minimized carbon dioxide consumption.

Yet a further object of the present disclosure is to present a carbonator, which is reliable in service. A further object of the present disclosure is to present a carbonator, which is suitable for domestic use.

Accordingly, the present disclosure presents a carbonator for producing carbonated beverage. Furthermore, present disclosure presents advantageous embodiments.

According to a first aspect of the present disclosure, at least one of these objects are met by a carbonator for producing carbonated beverage, comprising:

- a first connector 11 for a gas-outlet 105 of a CO2-container 104 and with a CO2-valve 12, operable between a closed state and an open state in which CO2-gas may be introduced from a gas-outlet 105 of a CO2-container 104 into the CO2-valve, and;
- a second connector 32 for a mouth 108 of a beverage container 107 and with a dissolver nozzle 31 for introducing CO2-gas into the beverage container 107, connected to the CO2-valve 12 and;
- a venting valve 40 connected to the second connector 32 and operable between a closed state and an open state in which excess CO2-gas may be led out from the beverage container 107 through the venting valve 40 and;
- an operating mechanism 80 configured to operate the CO2-valve 12 and the venting valve 40 between open and closed states, and
- a manipulator 103, coupled to the operating mechanism 80, for allowing a person to operate the operating mechanism 80 between:

- a start mode I in which the venting valve 40 is open and the CO2-valve 12 is closed, and;
- an end mode III in which the CO2-valve 12 is open and the venting valve 40 is closed, whereby;
- the operating mechanism 80 is configured to be set in an intermediate mode II, between the first mode I and the second mode III, in which both the venting valve 40 and the CO2-valve 12 are closed.

The particular arrangement of the closable venting valve and CO2-valve allows the person using the carbonator to perform multiple carbonation cycles without venting the beverage bottle. The person using the carbonator simply operates the operating machine between end mode III and intermediate mode II. This results in considerable reduction of consumption of CO2-gas. For example, a single carbonation cycle consumes approximately 7 gram. In conventional carbonators, two subsequent cycles with venting in-between, thus consumes approximately 14 grams of CO2-gas. However, in the carbonator according to the present disclosure, where carbonation is performed without venting, the second carbonation cycle only consumes 3.5 grams CO2-gas. Thus, two cycles of carbonation in the carbonator according to the present disclosure results in a CO2-consumption of approximately 10.5 grams (i.e. 7+3.5 grams). That is, a reduction of CO2 consumption of approximately 25%. In particular, the omission of venting between carbonation cycles provides two benefits which results in the low CO2-gas consumption. Firstly, since the beverage container is pressurized between carbonation cycles, CO2 moves from the gaseous atmosphere in beverage container into the water. Thus, carbonation continues between cycles. Secondly, since the beverage container is pressurized at all times, no CO2-gas is wasted in building up CO2 pressure in the beverage container when a subsequent carbonation cycle is initiated. Overall, a highly efficient carbonator is achieved which is easy to operate by a person.

The operating mechanism 80 may be configured such that the duration of the intermediate mode II is longer than the duration of the start mode I. This makes the intermediate mode II easy to find for the person operating the carbonator and avoids involuntary venting of the beverage bottle.

Typically, the venting valve 40 comprises a sleeve 41 with a movable valve body 44 and an actuator 46 arranged to be moved axially in the sleeve 41 by the operating mechanism 80 towards the valve body 44 to set the venting valve 40 in the open state. Likewise, the CO2-valve 12 comprises a sleeve 14 with an actuator 13, wherein the actuator 13 is arranged to be moved axially in the sleeve 14 by the operating mechanism 80 into the first connector 11 thereby setting the CO2-valve 12 in an open state. The use of such actuator/sleeve valves provides an advantage in that CO2-valve may fit CO2-bottles with different types of outlet valves and length or size of opening pins.

Typically, the operating mechanism 80 may comprise a bridge 85 that is rotationally journalled in the carbonator 100 and connected to the manipulator 103 such that the bridge 85 may be rotated by the manipulator 103 around a rotational axis Y extending through the bridge 85 and through the manipulator 103. The bridge 85 may comprise a venting surface 86 which is in contact with the actuator 46 of the venting valve 40 and a CO2-surface 90 which is in contact with the actuator 13 of the CO2-valve 12. The bridge is of simple construction and has few movable parts that may stick or jam. This allows for a compact and failsafe construction of the carbonator.

The operating mechanism 80 may further be arranged such that rotational movement of the operating mechanism 80 in a first direction displaces the venting surface 86 and the CO2-surface 90 relative the actuator 46 of the venting valve 40 and the actuator 13 of the CO2-valve such that the venting surface 86 forces the actuator 46 to set the venting valve 40 in an open state and the CO2-surface 90 forces the actuator 13 to set the CO2-valve 12 in an open state, and vice versa. The use of cooperating venting surfaces and CO2 surface allows for easy and failsafe simultaneous operation of the venting valve and the CO2-valve.

The venting surface 86 and the CO2-surface 90 may be oriented in a side-by-side manner along or parallel to, the rotational axis Y. The bridge thereby occupies a minimum of space.

The venting surface 86 comprises a first end surface 87 and a second end surface 88 with different configuration, wherein;

- the configuration of the first end surface 87 is selected such that, when the actuator 46 is in contact with the first end surface 87, the valve body 44 is forced by the actuator 46 to set the venting valve 40 in an open state and;
- the configuration of the second end surface 88 is selected such that when the actuator 46 is in contact with the second end surface 88, the valve body 44 sets the venting valve 40 is in the closed position. This configuration allows for high precision and high flexibility in setting the venting valve in open and closed state.

The CO2-surface 90 may be arranged to:

- move towards the actuator 13 of the CO2-valve 12 such that the actuator 13 is forced to extend into the connector 11 thereby setting the CO2-valve 12 an open state and;
- move away from the actuator 13 such that the actuator 13 is withdrawn in or from the connector 11 thereby setting the CO2-valve 12 in a closed state. This provides flexibility because the CO2-valve and the operating mechanism allows for the use of different sizes of CO2-bottles.

The configuration of the venting surface 86 and the configuration of the CO2-surface may advantageously be selected with respect to each other such that the venting valve 40 and the CO2-valve 12 simultaneous are in closed state during a portion of rotational movement of the bridge 85.

The manipulator 103 may be a lever, wherein the operating mechanism 80 is configured to be:

- in the start mode I during movement of the manipulator 103 in a first direction, over a first distance a1;
- in the intermediate mode II during movement of the manipulator 103 in a first direction, over a second distance a2 and;
- in the end mode III during movement of the manipulator 103 in a first direction, over a third distance a3, and vice versa, wherein;

the length of the intermediate mode II is selected such that the intermediate mode II is recognizable by the person operating the manipulator 103. The use of a lever to manipulate the operating mechanism of the carbonator is advantageous. This is so because it makes it easy for the person using the carbonator to operate the carbonator between the operational modes. In particular it has shown that the person using the carbonator easily may find the intermediate mode II and hold the operating mechanism in this position before initiating a subsequent carbonation cycle.

The manipulator 103 may be connected to the bridge 85 via a rotational damper 84. The rotational damper stabilizes the motion of the lever which in turn makes it easier to place mode II C and hold the operational mechanism 80 in the intermediate mode II. The rotational damper also avoids splashes of water through the venting valve during venting of the beverage container. This, because the damper 84 is connected to the bridge 85 and therefor retards the velocity by which the venting valve 40 and the CO2 12 valve may open and close.

The carbonator may comprise a first over-pressure valve 60 arranged to relieve over-pressure in a beverage container 107. The over-pressure valve 60 may comprise a sleeve 61 with a first end 61.1 connectable to the second connector 32 so that fluid may flow from the mouth 108 of a beverage container 107 in the second connector 32 into the first end 61.1 of said into first over-pressure valve 60. The sleeve 61 having a second end 61.4 with an opening 64.5. the over-pressure valve further comprises fluid conduit connector 67 for connection with a fluid drain 72 arranged within the sleeve 61 and partially extending out through said opening 64.5, and a movable valve body 63 with a fluid channel 63.1 arranged within the sleeve 61 and supported against the fluid conduit connector 67 by a compressible biasing element 65. An adjustment ring 68, may be turnable arranged on the second end 61.4 of the sleeve 61 and engages the fluid conduit connector 67 such that turning of the adjustment ring 68 moves the fluid conduit connector 67 towards or away from the valve body 63 and thereby causes the biasing element 65 to expand or compress. The design of the overpressure valve makes possible to adjust the spring force of the biasing element 65 and thereby the release pressure of the over pressure valve 60. A further advantage of the overpressure valve is that it may be fluid tight connected to a resilient draining pipe. This in turn avoids unwanted leakage of water through the over pressure valve.

A second aspect of the present disclosure relates to an over-pressure valve 60 comprising a sleeve 61 with a first end 61.1 connectable to the second connector 32 so that fluid may flow from the mouth 108 of a beverage container 107 in the second connector 32 into the first end 61.1 of said over-pressure valve 60 and;

said sleeve 61 having a second end 61.4 with an opening 64.5, and;

a fluid conduit connector 67 arranged within the sleeve 61 and partially extending out through said opening 64.5, and;

a movable valve body 63 with a fluid channel 63.1 arranged within the sleeve 61 and supported against the fluid conduit connector 67 by a compressible biasing element 65, and;

an adjustment ring 68, turnable arranged on the second end 61.4 of the sleeve 61, wherein;

the adjustment ring 68 engages the fluid conduit connector 67 such that turning of the adjustment ring 68 moves the fluid conduit connector 67 towards or away from the valve body 63 and thereby causes the biasing element 65 to expand or compress.

Typically, the carbonator comprises:

a CO2-head 10 with the first connector 11 for a gas-outlet 105 of a CO2-container 104 and with the CO2-valve 12, and;

a dissolver head 30 with the second connector 32 for a mouth 108 of a beverage container 107 and with the dissolver nozzle 31 for introducing CO2-gas into the beverage container 107, connected to the CO2-valve 12 and wherein;

the venting valve 40 is arranged in the CO2-head 10 and wherein;

the operating mechanism 80 is arranged in the CO2-head 10. This arrangement is suitable in connection with a manipulator 103 in the form of a lever.

DETAILED DESCRIPTION OF EMBODIMENTS

The carbonator according to the present disclosure will now be described more fully hereinafter. The carbonator according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Same reference numbers refer to same elements throughout the description.

Figure 1:
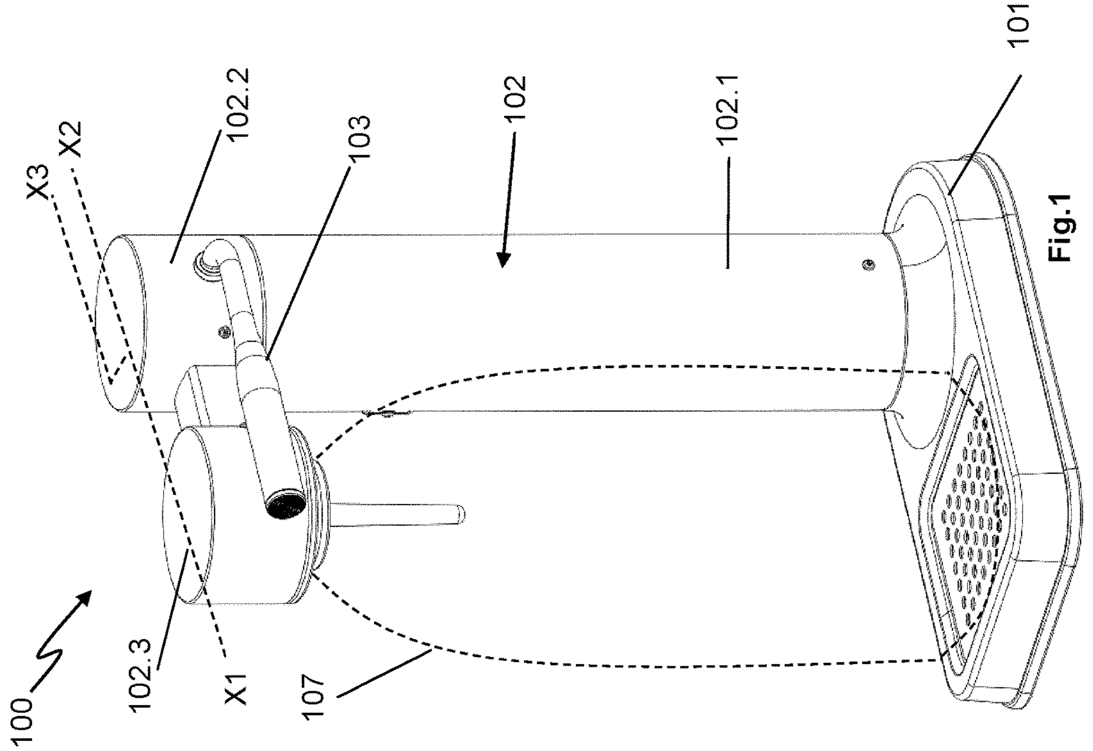
FIG. 1: A carbonator according to a first alternative of the present disclosure.

FIG. 1 shows a carbonator 100 according to a first alternative of the present disclosure. The carbonator 100 comprises abase 101 for supporting the carbonator on a surface, such as a table or bench. A housing 102 extends upwards from the base 101. Housing 102 has a lower cylindrical portion 102.1 which may accommodate a CO2-container and an upper portion 102.2 which may accommodate a carbonation arrangement (which will be described later). The housing 102 further comprises a distal portion 102.3, which extends from the upper portion 102.2 of the housing. A manipulator 103, in the form of a lever, extends from the upper portion 102.2 of the housing 102 so that it is accessible to a person. A beverage container 107 for containing a liquid to be carbonated extends from the distal portion 102.3 of the housing 102.

Figure 2:
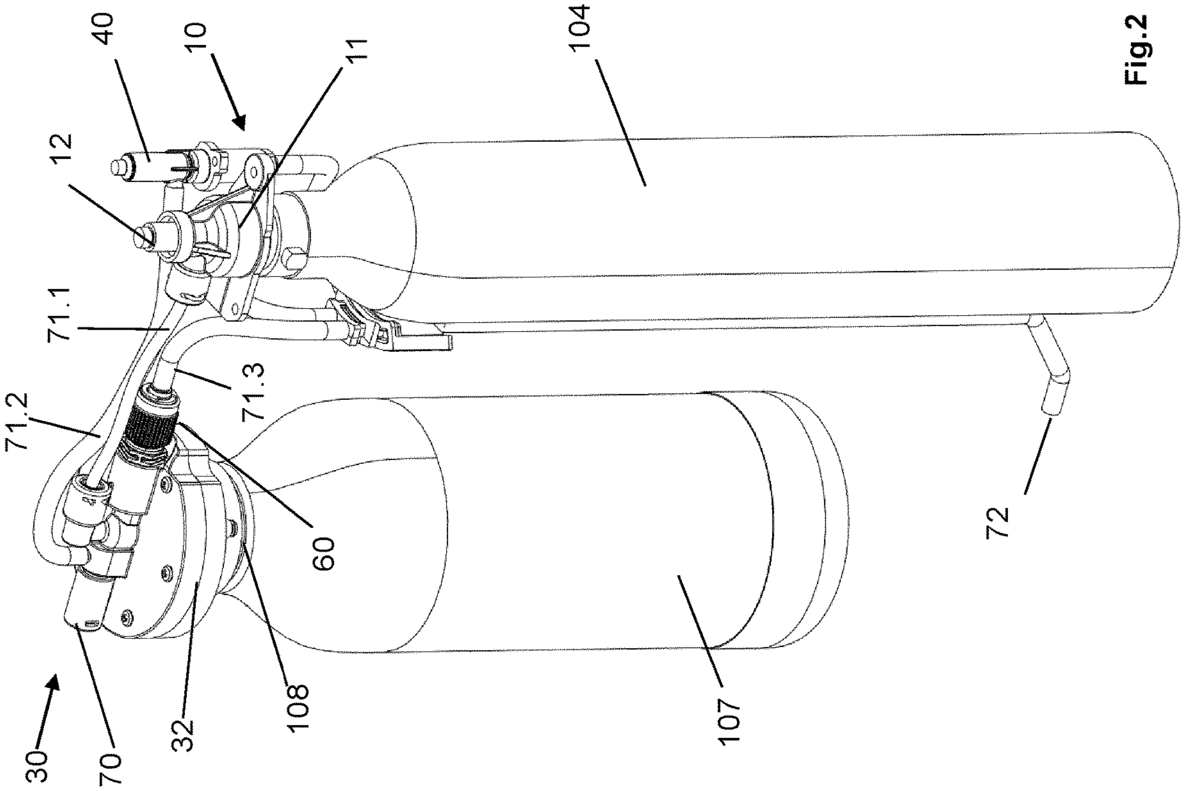
FIG. 2: An exposed view of the carbonator of the present disclosure.

FIG. 2 shows a stripped view of the carbonator of FIG. 1. Thus, the carbonator 100 comprises a first connector 11 for a gas-outlet of the CO2-container and second connector 32 for a mouth 108 of the beverage container 107 and a CO2-valve 12 for operating the CO2-container 104, and a first over-pressure valve 60 and second over-pressure valve 70 both for letting CO2-gas out of the beverage container 107 and a venting valve 40 operable to release pressure out of the beverage container. A first fluid conduit 71.1, such as a rubber hose, connects the CO2-valve 12 with the dissolver nozzle 31 (not shown). A second fluid conduit 71.2 connects the second connector 32 with the venting valve 40 and a third fluid conduit 71.3 connects the first over-pressure valve 60 to a drain 72.

Figure 2A:
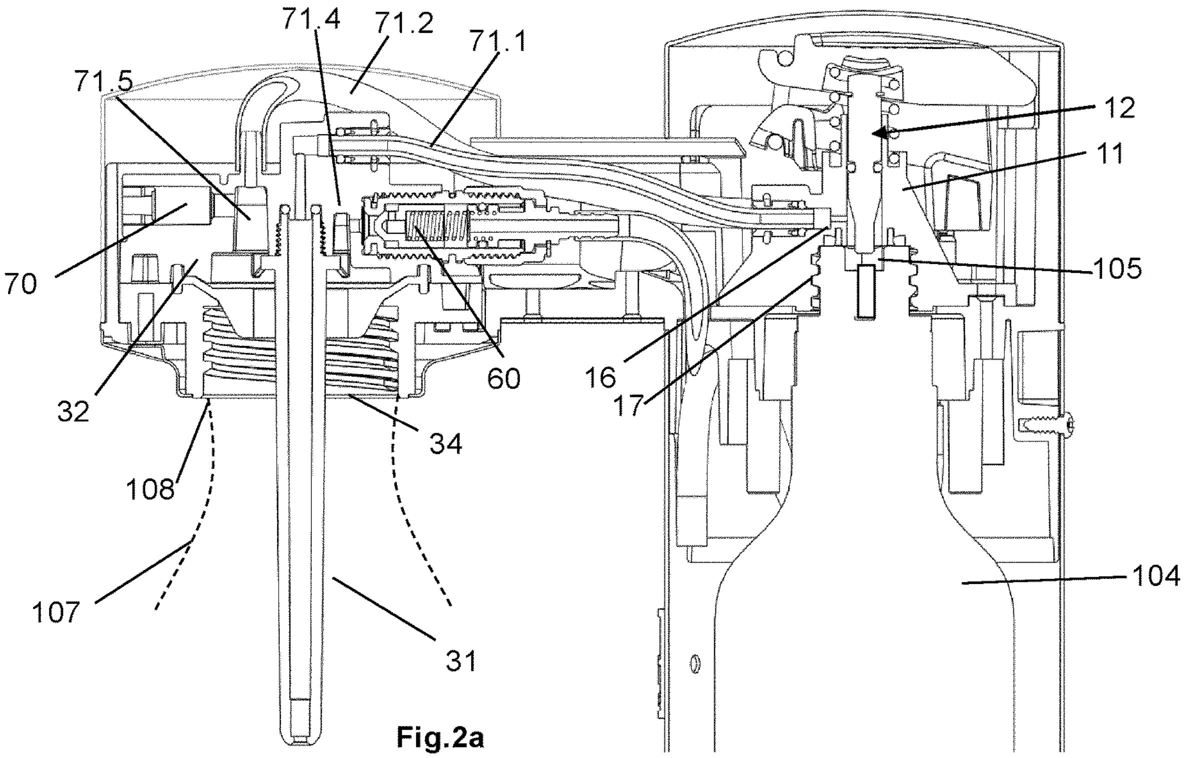
FIGS. 2*a*,2*b*: A portion of the carbonator of the present disclosure in cross-section.
Figure 2B:
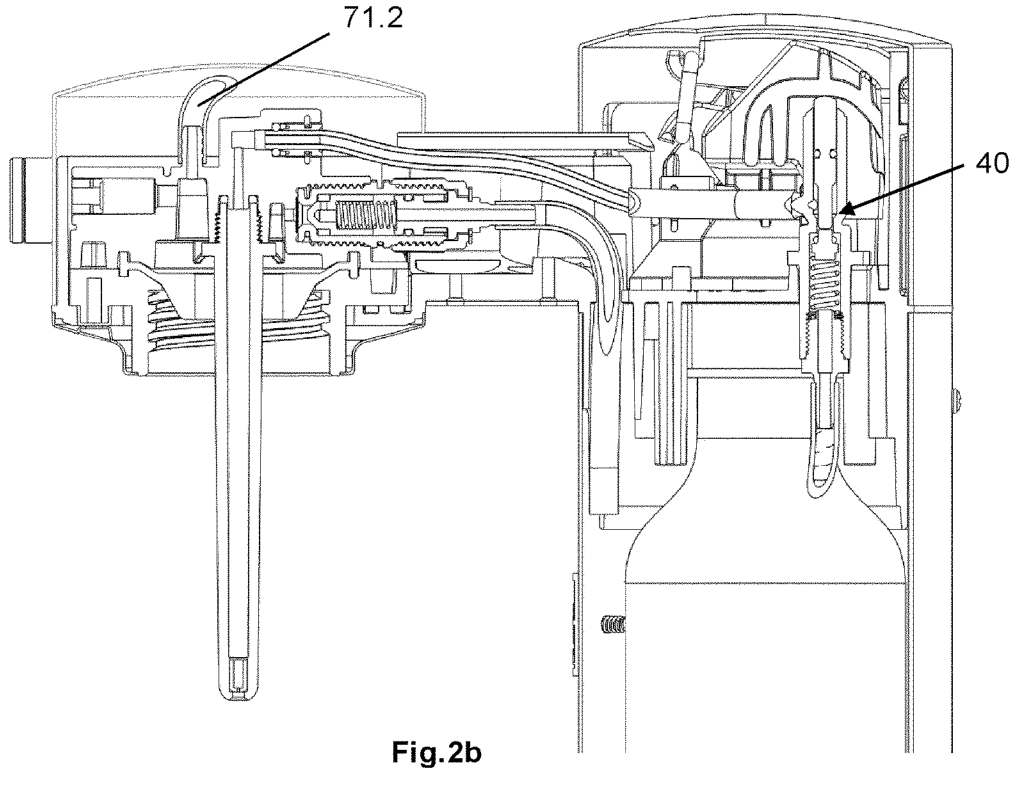

As shown in FIGS. 1 and 2, the carbonator has a CO2-head 10 and a dissolver head 30 that are spaced apart from each other. The dissolver head 30 has thereby the second connector 32 for a mouth 108 of a beverage container 107 and the dissolver nozzle 31. The CO2-head has the first connector 11, the CO2-valve 12, the venting valve 40 and an operating mechanism 80 (not shown, but which will be described further below). FIG. 2*a* shows a cross-sectional view along the line X1-X2 of the carbonator shown in FIG. 1. FIG. 2*b* shows a cross-sectional view along the line X1-X3 of the carbonator shown in figure.

Thus, FIG. 2*a* shows in cross-section the upper portion of the carbonator 100 of the present disclosure. Thus, the first connector 11 may comprise an opening 17 with an inner thread for screw-connection with the gas-outlet 105 a CO2-container 104. Also the second connector 32 may comprise an opening 34 with an inner thread for screw connection to an outer thread on the mouth 108 of the beverage container 107. However, other types of connectors are feasible for one or both of the opening 17 in the first connector and the opening 34 in second connector 32. For example, bayonet connectors. A dissolver nozzle 31 extends through the opening 34 of the second connector 32. The dissolver nozzle 31 may thereby extend through the mouth 108 of a beverage container 107 connected to the second connector 32. The dissolver nozzle 31 is connected to the CO2-valve 12 via the first fluid conduit 71.1 which is connected to a CO2-outlet 16 of the CO-valve 12. The CO2-valve 12 is arranged to be operated between a closed state, in which no CO2-gas enters the CO2-valve 12, and an open state in which CO2-gas may be introduced from the gas-outlet 105 of the CO2-container 104 into the CO2-valve 12 and further to the dissolver nozzle 31. Also shown in FIG. 2*a* is the first over-pressure valve 60 which is connected to the opening 34 in the second connector 32 by a fourth fluid conduct 71.4 which may be formed in the second connector 32. The overpressure valve 60, which will be described later, is configured to open when the pressure in the beverage container 107 exceeds a first predetermined value, for example 5-6 bar. Also shown in FIG. 2*a* is the second over-pressure valve 70 which may be connected to the opening 34 in the second connector 32 by a fifth fluid conduit 71.5. The second over pressure valve 70 is configured to open when the pressure in the beverage container exceeds a second predetermined pressure, for example 12 bar. This type of valve is known in the art and need not to be described further here within.

Figure 8A:
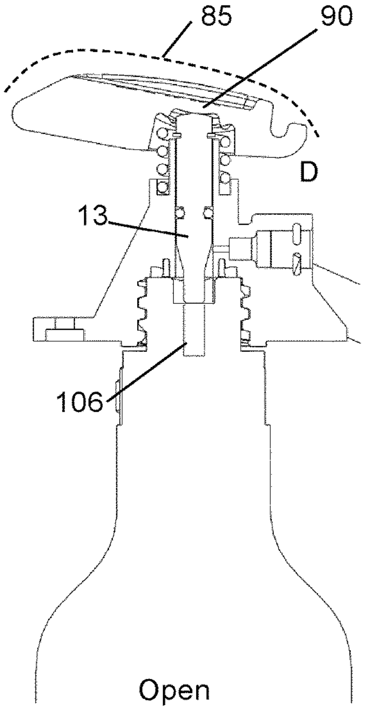
FIGS. 8*a*-*c*: Drawings showing the CO2-valve of the carbonator of the present disclosure in different modes.
Figure 8B:
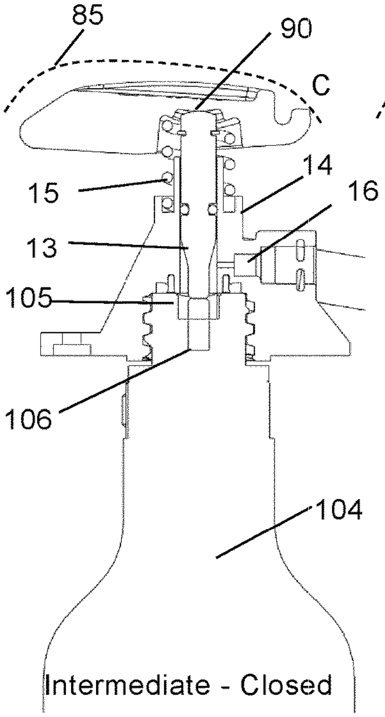

The CO2-valve 12 is shown in detail in FIG. 8*b*. Thus, the CO2-valve 12 comprises a sleeve 14, which may be a separate sleeve or is formed by a portion of the first connector 11. The sleeve may also be denominated cylinder. A CO2-outlet 16 is formed in the wall of the sleeve 14. An actuator 13, which may be rod-shaped, is arranged axially movable in the sleeve 14 such that the actuator 13 may move into the opening 17 of the first connector 11 and depress an opening pin 106 of the CO-container 104 such that CO2-gas may exit from the gas-outlet opening 105 of the CO2-container 104. This type of CO2-containers (i.e. CO2-bottles) are known in the art and need not be explained further. Thus, when the actuator 13 extends sufficiently into the opening 17, the CO2-valve 12 is in open state and CO2-gas may flow from the CO2-container 104, through the CO2-valve 12 out through the CO2-outlet 16 and further out through the end of the dissolver nozzle 31 (see, FIG. 2*a*).

FIG. 2*b* shows the venting valve 40 which is arranged to be operated between an open and closed state. In the open state excess CO2-gas may be led out from the beverage container 107 through fluid connector 71.2 and out through the venting valve 40. In the closed state no excess CO2-gas may be led from the beverage container 107 through the venting valve 40.

Figure 7A:
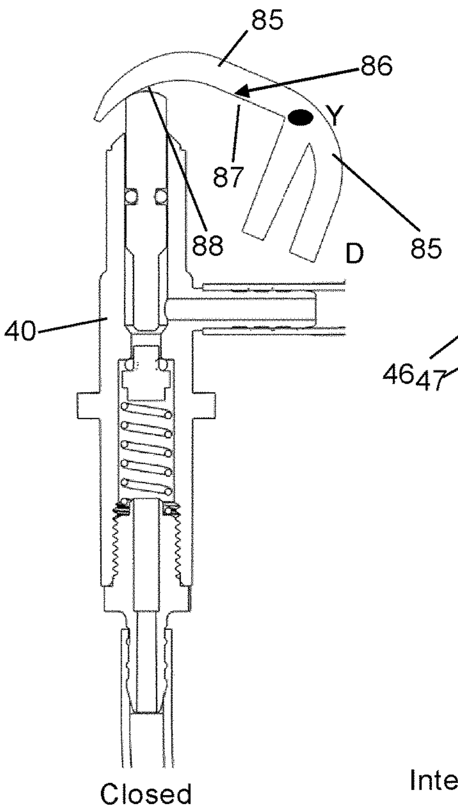
FIGS. 7*a*-*c*: Drawings showing the venting valve of the carbonator of the present disclosure in different modes.
Figure 7B:
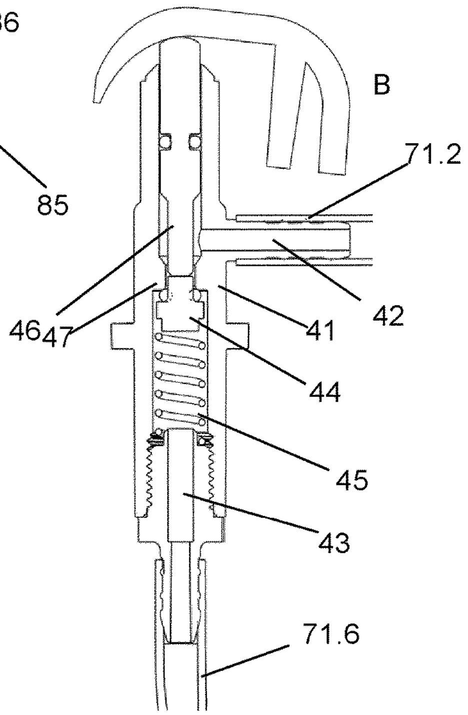

The venting valve 40 is shown in detail in FIG. 7*b*. Thus, the venting valve 40 comprises a sleeve 41, which may be a separate sleeve or formed by a portion of the second connector 32. An excess CO2-inlet 42 is formed in the wall of the sleeve 41. The excess CO2-inlet 42 is connected by fluid connector 71.2 to the opening 34 of the second connector 32 (see FIG. 2*a*). The venting valve 40 comprises an outlet 43 which may be open to the atmosphere, in this case connected to a drain pipe 71.6 (see FIG. 2). A valve body 44 is movable arranged axially in the sleeve 41. The valve body 44 is biased towards a shoulder 47 in the first end of the sleeve 41 by biasing element 45 in the form of a pressure spring. The venting valve 40 further comprises an actuator 46, which may be rod-shaped, that is movable axially in the sleeve 40 towards and away from the valve body 44. Thus, the actuator 46 may be moved towards the valve body 44 such that the valve body 44 is moved away from the shoulder 47. The venting valve 40 is thereby set in an open mode in which excess CO2-gas may be led from the beverage container 107 through the excess CO2-opening 42 and out through the outlet 43 of the venting valve 40 (See FIG. 7*c*). When the force on the actuator 46 is released, the valve body 44 moves, biased by the biasing element 45, against the shoulder 47. The venting valve 40 is thereby set in a closed state (see FIG. 7*a*).

Figure 3:
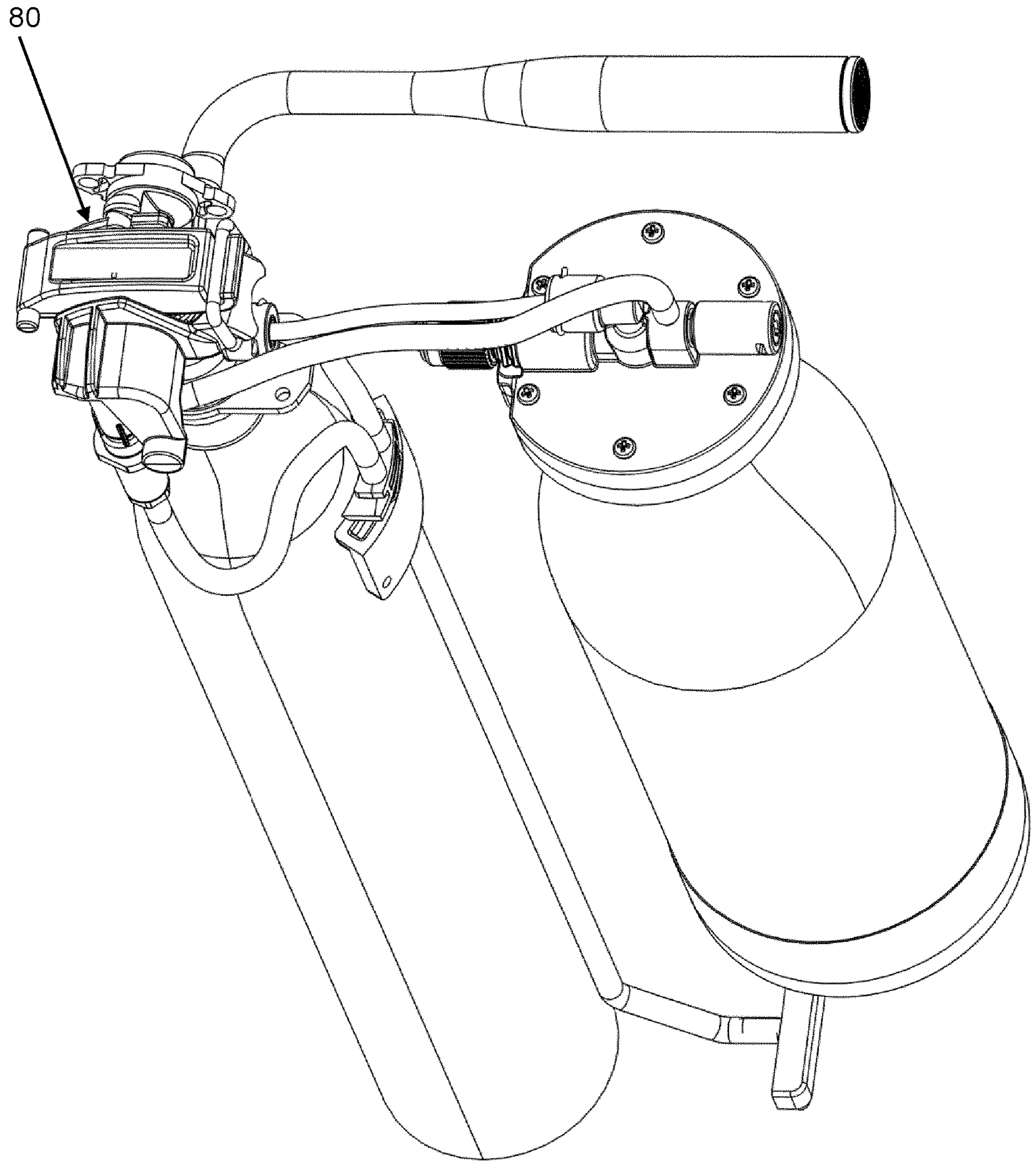
FIG. 3: A view from above of the carbonator of the present disclosure.

Reference is now made to FIG. 3. According to one aspect of the present disclosure, the carbonator 100 comprises an operating mechanism 80 which is configured to operate the CO2-valve 12 and the venting valve 40 (not shown) between their respective open and closed positions.

Figure 4:
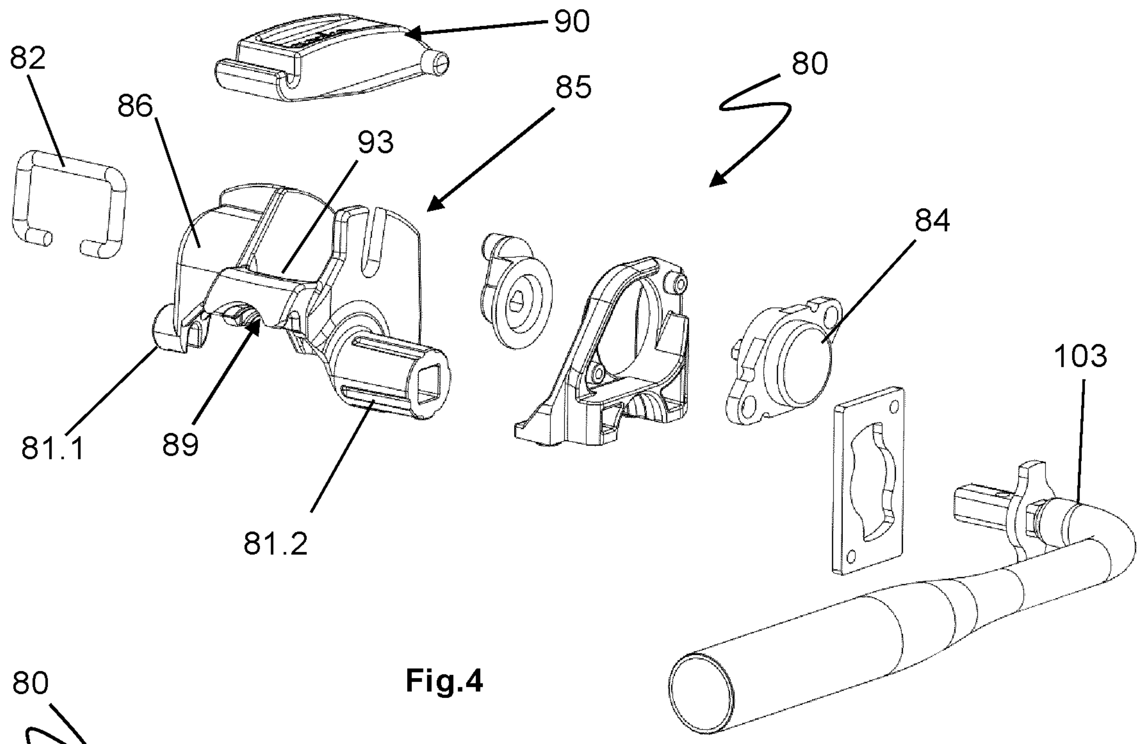
FIG. 4: An exploded view of the operating mechanism of the carbonator of the present disclosure.
Figure 5A:
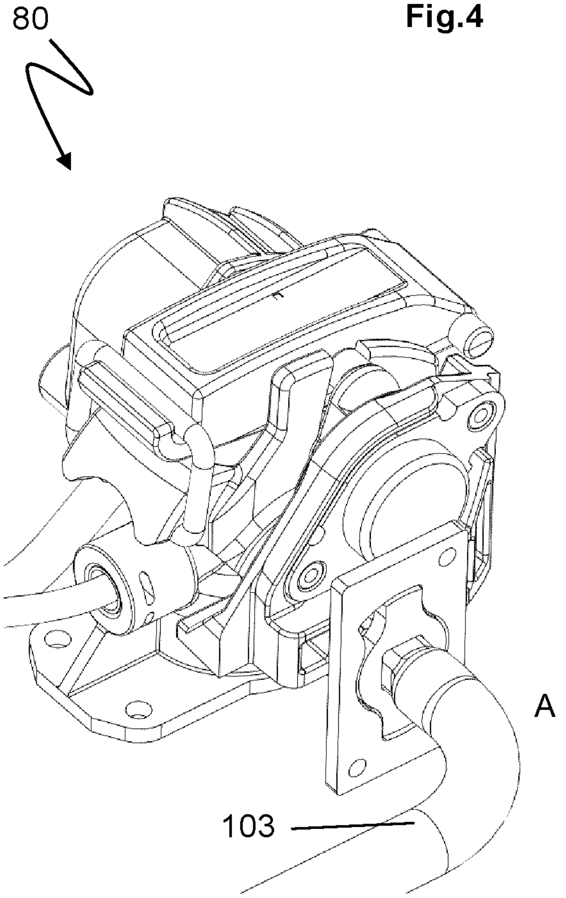
FIGS. 5*a*,*b*: The operating mechanism of the carbonator of the present disclosure in different states.
Figure 5B:
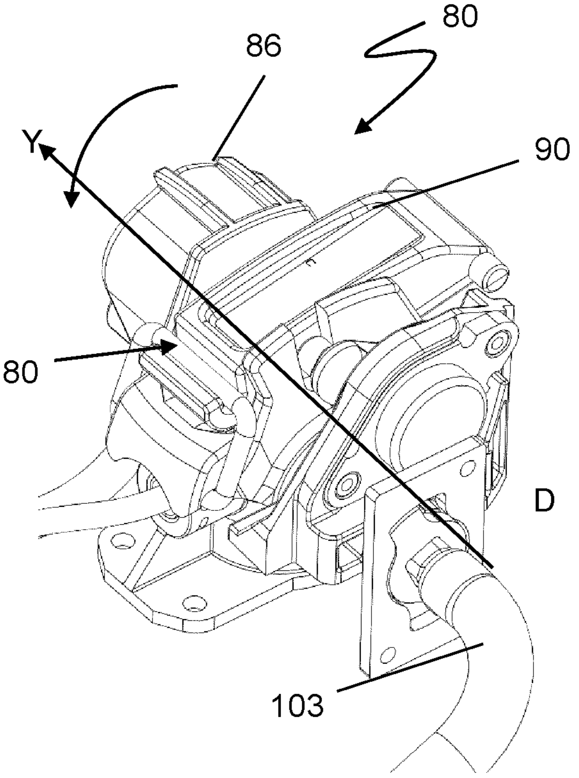

FIG. 4 shows the operating mechanism 80 in an exploded view. Thus, the operating mechanism 80 comprises a bridge 85 which is configured to be rotationally journalled in the carbonator 100, for example in the upper portion 102.2 of the housing 102 or in the first connector 11. The operating mechanism 80 therefore comprises two attachments 81.1, 81.2 which respectively are configured to be rotationally coupled with corresponding attachments in the carbonator (not shown). The bridge 85 comprises a venting surface 86 which, in operation, is configured to contact the end of the actuator 46 of the venting valve 40 (see FIG. 7*a*). The bridge 85 further comprises a CO2-surface 90 which, in operation, is configured to contact the end of the actuator 13 of the CO2-valve 12 (see FIG. 8*b*). In the embodiment of FIG. 4, the CO2-surface 90 is realized as one side of a separate piece which in one end is connectable by a shackle 82 to a corresponding loop 89 on the bridge 85. The bridge 85 thereby comprises a through opening 93, through which the actuator 13 of the CO2-valve 12 may extend into contact with the CO2-surface 90. The operating mechanism 80 is further connectable to the aforementioned manipulator 103, in the shown embodiment a lever, such that a person may operate the operating mechanism 80 so that it pivots around an axis Y which extends through the two connections 81.1 81.2. The operating mechanism 80 may further comprise a rotational damper 84, which may be connected to the bridge 85 and to the manipulator 103 such that the rotational movement of the bridge 85 is retarded. Such rotational dampers are commercially available as rotation/rotary silicone dampers. FIG. 5*a* shows the operating mechanism 90 in assembled state. In FIG. 5*b*, the bridge 85 is pivoted by the manipulator 103. Rotational movement of the operating mechanism causes the bridge 85 to pivot. As a result thereof the venting surface 86 pivots and the CO2-surface 90 raises or lowers due to that it is connected in one end to the bridge 85 by the shackle 82. Notable is that the venting surface 86 and the CO2-surface are arranged in a substantially side-by-side manner along the horizontal axis Y which may extend through the attachments 81.1, 81.2 of the bridge.

According to one aspect of the present disclosure, the operating mechanism 80 is arranged such that rotational movement of the operating mechanism 80 in a first direction sets the venting valve 40 (not shown) in an open state and the CO2-valve 12 (not shown) in a closed state. Rotational movement of the operating mechanism 85 in the other direction sets the venting valve 40 (not shown) in a closed state and the CO2-valve 12 in an open state. The rotational movement of the operating mechanism, and thereby the bridge 85, is typically limited between a first end position A and a second end position D as indicated in FIGS. 5*a* and 5*b*, respectively. Cross-sectional views of bridge and venting- and CO2-surfaces are shown in FIGS. 7*a*, 8*a*.

According to one aspect of the present disclosure, it has been found that careful configuration of the venting surface 86 and the CO2-surface 90 with respect to each other allows the carbonator to be set in three distinct operational modes.

Figure 6:
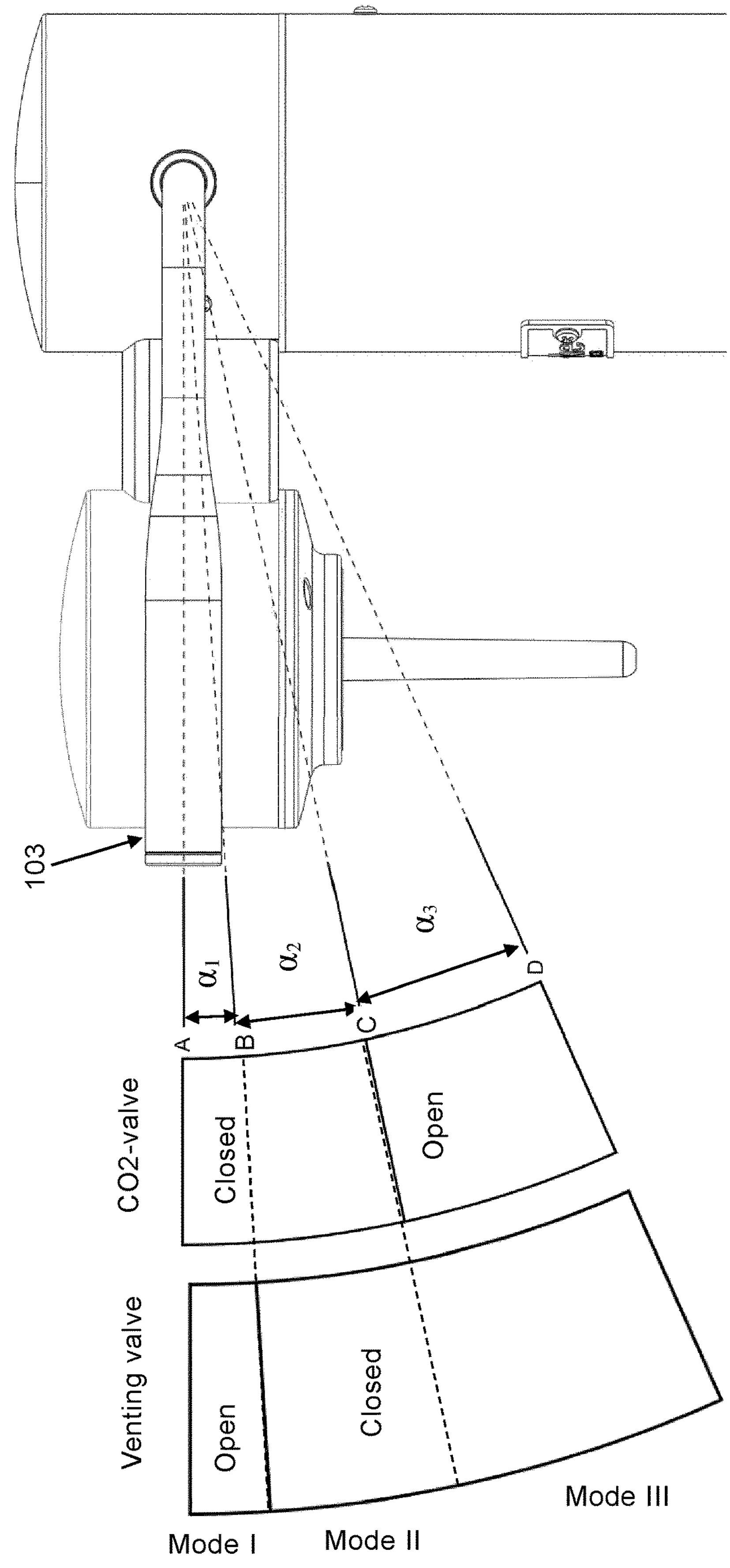
FIG. 6: A schematic diagram showing different modes of the carbonator of the present disclosure.

Reference is now made to FIG. 6. The operating mechanism 80, e.g. the venting surface 86 and the CO2-surface 90 thereof are configured such that the operating mechanism 80 (not shown) is:

In a start mode I in which the venting valve 40 is open and the CO2-valve 12 is closed.

The operating mechanism 80 is in the start mode I during movement of the manipulator 103 in a first direction, from the first end position A over a first predetermined distance a1 to position B.

In an intermediate mode II in which the venting valve 40 is closed and the CO2-valve 12 is closed. The intermediate mode II is subsequent the start mode I and the operating mechanism 80 is in the intermediate mode II during movement of the manipulator 103 over a second predetermined distance a2 from position B to position C.

In an end mode III in which the venting valve is closed and the CO2 valve is open. The end mode III is subsequent the intermediate mode II and the operating mechanism 80 is in the end mode III during movement of the manipulator 103 over a third predetermined distance a3 from position C to the second end position D. It is appreciated the operating mechanism 80 may be halted in any of the three modes I, II, III by the person operating the operating mechanism through the manipulator 103. The above description is also valid for a situation in which the operating mechanism 80 is moved in direction from the second end position D towards the first end position A.

This, configuration allows the person using the carbonator to easily perform repeated carbonation cycles by simply move the operating mechanism 80 between the end mode III and the intermediate mode II. The handle shaped lever allows the person to easily find the different modes. It has shown that the person will using the carbonator learns to recognize the different modes in little time. To facilitate recognition of the modes, the modes may be of different length. For example, the intermediate mode II may be longer than the start mode I.

One exemplary configuration of a bridge 85 that achieves the aforementioned operational modes I, II, II will in the following be described in detail with reference to FIGS. 7*a*-7*c* and 8*a*-8*c*.

FIG. 7*a* shows a cross-sectional view of the venting valve 40 and the portion of the bridge 85 that constitutes the venting surface 86. As mentioned the venting surface 86 is a surface of the bridge 85 that is in contact with the actuator 46 of the venting valve 40. To allow purposeful movement of the actuator 46, the venting surface 86 may comprise a first end surface 87 and a second end surface 88. The first end surface 87 may extend from the pivot point Y of the bridge 85 to the second end surface 88. In the disclosed embodiment, the first and the second end surface 87, 88 are configured such they have different geometry. In detail, the first end surface 87 may be flat or have a radius that is greater than the radius of the second end surface 88. However, it is also possible that the end surfaces are substantially straight and form an angle with each other. The length of the first and second end surfaces 87, 88 may also vary. In the embodiment shown in FIGS. 7*a*-7*c*, geometry and the lengths of the first and the second end surfaces 87, 88 are selected such that the distance between the venting surface 86 and the venting valve 40 (i.e. the top of the sleeve 41) varies in a predetermined manner during rotation of the bridge 85 and thereby causes the actuator 46 of the venting valve 40 to set the venting valve in closed or open position.

Figure 7C:
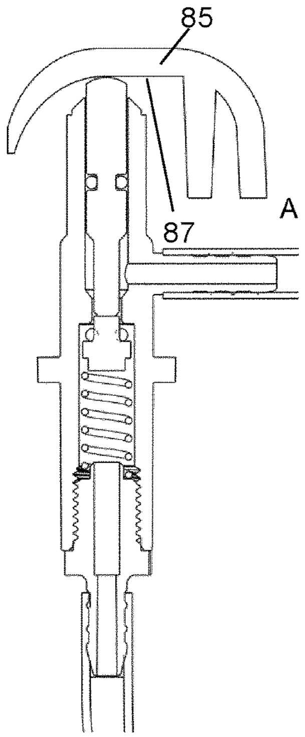

Thus, as shown in FIG. 7*c*, the bridge 85 is in position A (see FIG. 6) in which the actuator 46 is in contact with the first end surface 87. The configuration of the first end surface 87, which may be substantially straight, results in a distance between the first end surface 87 and the venting valve 40 which is sufficiently small to force the actuator 46 against the valve body 44 so that the valve body is moved out of contact with the shoulder 47. Thus, the venting valve 40 is in open state when the bridge is in position A.

In FIG. 7*b*, the bridge 85 has pivoted further to position B (see FIG. 6) and the actuator 46 contacts the beginning of the second end surface 88. The distance between the second end surface 88 and the venting valve 40 (i.e. the top of the sleeve 41) is sufficiently great to allow the actuator 46 to rest, without exerting any force, onto the valve body 44. This causes the valve body 44 to sealingly contact the shoulder 47 whereby the venting valve is in closed mode. Thus, the venting valve 40 is in closed state when the bridge 85 is in position B and in open state during pivoting of the bridge 85 from position A to position B (e.g. up to but not including).

In FIG. 7*a*, the bridge 85 has pivoted to position D. The configuration of the second end surface 88, which may have a radius, results in a distance between the second end surface 88 and the venting valve 40 which is sufficiently great to allow the actuator 46 move out of contact with the valve body 44. This causes the valve body 44 to sealingly contact the shoulder 47 whereby the venting valve 40 is in closed mode. Thus, the venting valve 40 is in closed state when the bridge 85 is in position D and during pivoting of the bridge 85 from position B, over position C to position D.

Figure 8C:
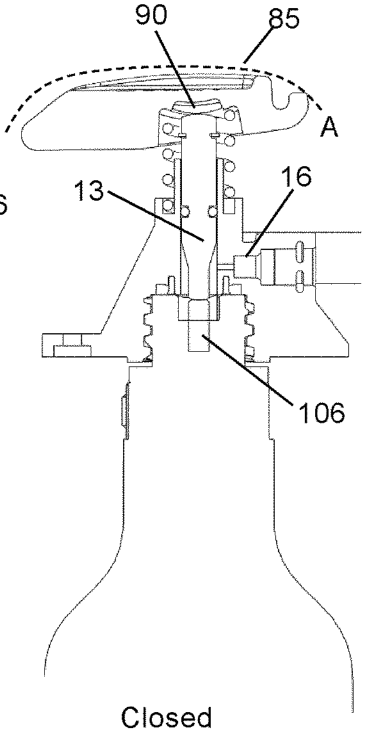

FIGS. 8*a*-8*c* shows the corresponding movement of the CO2-surface 90 relative the actuator 13 of the CO2-valve 12.

Thus, in FIG. 8*c*, the bridge 85 (schematically indicated) is in position A (see FIG. 6) whereby the CO2-surface 90 is lowered such that the distance between CO2-surface 90 and the CO2-valve 12 (i.e. the sleeve 14) is sufficiently large to allow the actuator 13 to move out of contact with the valve body 106 of the CO2-container. Alternatively, to rest without exerting force on the valve body 106. The CO2-valve is thereby in closed state when the bridge is in position A.

In FIG. 8*b*, the bridge 85 has pivoted further to position C (see FIG. 6) thereby placing the CO2-surface 90 at a distance from the CO2-valve such that the actuator 13 is immediately prior to opening the valve 106 of the CO2-bottle. The CO2-valve is in closed state when the bridge 85 is in position C and during pivoting of the bridge 85 from position A, over position B to position C.

In FIG. 8*a*, the bridge 85 has pivoted to position D (see FIG. 6) in which the distance between the CO2-surface 90 and the CO2-valve 12 is selected such that the CO2-surface 90 forces the actuator 13 against the valve body 106 of the CO2-container to open the gas-outlet 105. The CO2-valve is in open state when the bridge 85 is in position D and during pivoting of the bridge 85 from position C to position D.

Thus, between position B and C of the bridge 85 there is a region (operational mode II) where both the venting valve 40 and the CO2-valve are closed. The person operating the carbonator may easily find this region and use it as starting point for subsequent carbonation cycles without intermediate venting.

Further, according to the present disclosure, configuration of the first and second end surfaces of the venting surface and the lifting motion of the CO2-surface have been by carefully selecting the in view of each other, in particular, in view of geometry and length. This in turn has made it possible to tailor the state of the respective venting- and CO2-valves and the duration of these states such that the three different operational modes I, II, III of the carbonator are achievable.

As discussed with respect to FIG. 2, the carbonator may comprise an over-pressure valve 60 that is coupled to the second connector 32 such that fluid may be led from the mouth of a beverage container 107 through the overpressure valve 60 and out into the atmosphere.

Figure 9:
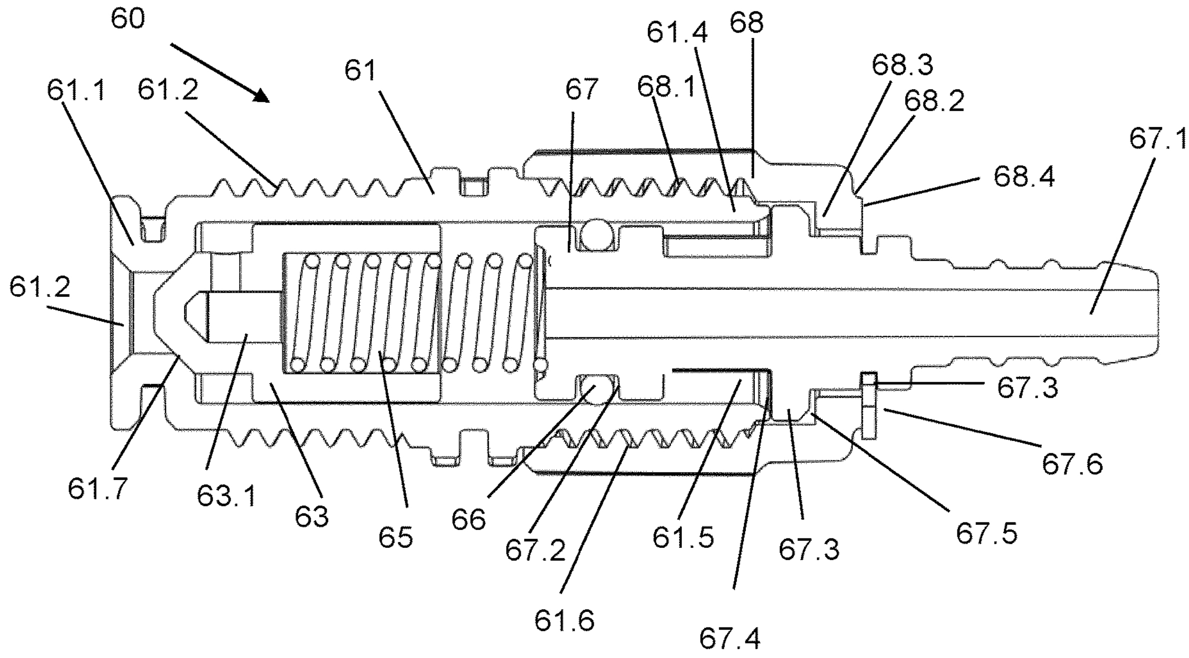
FIG. 9: An over-pressure valve of the carbonator of the present disclosure.

The over-pressure valve 60 is shown in detail in FIG. 9. Thus, the over-pressure valve 60 comprises a sleeve 61 with a first end 61.1 which is configured to be attached to the second connector 32. The first end 61.1 of the sleeve 61 may therefore be provided with an attachment portion 61.2 in the form of an outer thread. The second connector may be provided with a corresponding threaded bore (not shown). The first end 61.1 of the sleeve 61 has an opening 61.2 through which fluid may enter from the beverage bottle in the second connector 32 (not shown) into the sleeve 61. The sleeve 61 has further an opposite second end 61.4 with an opening 61.5. The opposite second end 61.4 may comprise an outer thread 61.6.

A fluid conduit connector 67 for connection with a fluid drain is arranged within the sleeve 61 and may, as shown in FIG. 9, have a male hose connector 67.1 which extends from the second opening 61.5 in the sleeve 61. The fluid conduit connector 67 is sealed against the inner surface of the sleeve 61 by a circumferential sealing element 66. The sealing element 66 is resilient and may be realized in the form of an O-ring, for example manufactured from rubber or silicone. The circumferential sealing element 66 may be received in a rear groove 67.2 in the fluid conduit connector 67. The fluid conduit connector 67 further comprises a forward flange 67.3 with a rear surface 67.4 which is directed towards the second opening 61.5 in the sleeve and a front surface 67.5. The fluid conduit connector further comprises a front flange 67.6 which may be realized as a piece of sheet metal (partly shown in FIG. 9) which is clipped into a front groove 67.7 of the fluid conduit connector 67.

A valve body 63 is arranged within the sleeve 61, in the first end 61.1 thereof. The valve body 63 comprises a channel 63.1 which permits fluid to be led through the valve body 63. The valve body 63 is movable within the sleeve 61 and biased by one end of a compressible biasing member 65 in the form of a pressure spring against an abutment surface 61.7 on the first end 61.1 of the sleeve 61. The other end of the biasing member 65 is supported against the fluid conduit connector 67. In operation, when the pressure of the fluid in opening 61.2 of the first end 61.1 of the sleeve 61 exceeds a predetermined value (i.e. 5-6 bar) the valve body 63 is forced away from the abutment surface 61.7 to an open position in which pressurized fluid (water and/or CO2) may flow through the channel 63.1 in the valve body 63 and out through the fluid line connector 67. When the pressure drops below the predetermined value, the biasing element 65 forces the valve body 63 back towards the abutment surface 61.7, whereby the over pressure valve is closed. The predetermined value is determined by the spring force of the pressure spring 65.

The fluid conduit connector 67 is adjustably held in the sleeve 61 by a turnable adjustment ring 68 which is arranged on the second end 61.4 of the sleeve 61. The ring 68 has an inner thread 68.1 which engages the outer thread 64.2 on the second end 61.4 of the sleeve 61. The ring 68 further has a narrowed end 68.2 with an inner abutment surface 68.3. The front end of the ring 68 has an outer abutment surface 68.4.

As shown in FIG. 9, the ring 68 is screwed onto the second end 61.4 of the sleeve 61 such that the inner abutment surface 68.3 of the ring 68 bears against the front surface 67.5 of the forward flange 67.3 of the fluid conduit connector 67. The male hose connector 67.1 extends out through the narrowing end 68.2 of the ring 68 and the front flange 67.6 of the fluid conduit connector 67 bears against the outer abutment surface 68.4 of the ring 68.

In operation, the fluid conduit connector 67 may be moved axially in the sleeve 61 by turning of the ring 68. Turning in anti-clockwise direction will move the fluid conduit connector 67 towards the second end 61.4 of the sleeve 61 and thus allowing the biasing element 65 to expand. Turning in clockwise direction will move the fluid conduit connector 67 towards the first end 61.1 of the sleeve 61 and thus cause the biasing element 65 to compress. This makes possible to adjust the spring force of the biasing element 65 and thereby the release pressure of the over pressure valve 60. A further advantage is that the fluid conduit connector 67 is constantly sealed against the inner surface of the sleeve 61 by the circumferential sealing element 66 in rear groove 67.2 of the fluid conduit connector 67. This further improves the adjustment of the over-pressure valve 60.

Numbered Example Embodiments

The technology described in this disclosure thus encompasses without limitation the following numbered example embodiments (E). It should be appreciated that the numbered example embodiments are listed for the purpose of facilitating the understanding of various aspects and embodiments of this disclosure. The numbered example embodiments are not claims that define the scope of protection conferred. The appended claims of the disclosure define the invention and, accordingly, the scope of protection conferred.

E1. A carbonator (100) for producing carbonated beverage comprising:

a first connector (11) for a gas-outlet (105) of a CO2-container (104) and with a CO2-valve (12), operable between a closed state and an open state in which CO2-gas may be introduced from a gas-outlet (105) of a CO2-container (104) into the CO2-valve, and;

a second connector (32) for a mouth (108) of a beverage container (107) and with a dissolver nozzle (31) for introducing CO2-gas into the beverage container (107), connected to the CO2-valve (12) and;

a venting valve (40) connected to the second connector (32) and operable between a closed state and an open state in which excess CO2-gas may be led out from the beverage container (107) through the venting valve (40) and;

an operating mechanism (80) configured to operate the CO2-valve (12) and the venting valve (40) between open and closed states, and a manipulator (103), coupled to the operating mechanism (80), for allowing a person to operate the operating mechanism (80 between:

a start mode (I) in which the venting valve (40) is open and the CO2-valve (12) is closed, and;

an end mode (III) in which the CO2-valve (12) is open and the venting valve (40) is closed, whereby;

the operating mechanism (80) is configured to be set in an intermediate mode (II), between the first mode (I) and the second mode (III), in which both the venting valve (40) and the CO2-valve (12) are closed.

E2. The carbonator (100) according to embodiment E1, wherein the operating mechanism (80) is configured such that the duration of the intermediate mode (II) is longer than the duration of the start mode (I).

E3. The carbonator (100) according to embodiment E1 or E2, wherein the venting valve (40) comprises a sleeve (41) with a movable valve body (44) and an actuator (46) arranged to be moved axially in the sleeve (41) by the operating mechanism (80) towards the valve body (44) to set the venting valve (40) in the open state.

E4. The carbonator (100) according to any one of embodiments E1-E3, wherein the CO2-valve (12) comprises a sleeve (14) with an actuator (13), wherein the actuator (13) is arranged to be moved axially in the sleeve (14) by the operating mechanism (80) into the first connector (11) thereby setting the CO2-valve (12) in an open state.

E5. The carbonator (100) according to any one of embodiments E1-E4, wherein the operating mechanism (80) comprises a bridge (85) that is rotationally journalled in the carbonator (100) and connected to the manipulator (103) such that the bridge (85) may be rotated by the manipulator (103) around a rotational axis (Y) extending through the bridge (85) and through the manipulator (103.

E6. The carbonator (100) according to embodiment E5, wherein the bridge (85) comprises a venting surface (86) which is in contact with the actuator (46) of the venting valve (40) and a CO2-surface (90) which is in contact with the actuator (13) of the CO2-valve (12).

E7. The carbonator (100) according to embodiment E6, wherein the operating mechanism (80) is arranged such rotational movement of the operating mechanism (80) in a first direction displaces the venting surface (86) and the CO2-surface (90) relative the actuator (46) of the venting valve (40) and the actuator (13) of the CO2-valve such that the venting surface (86) forces the actuator (46) to set the venting valve (40) in an open state and the CO2-surface (90) forces the actuator (13) to set the CO2-valve (12) in an open state, and vice versa.

E8. The carbonator (100) according to embodiment E6 or E7, wherein the venting surface (86) and the CO2-surface (90) are oriented in a side-by-side manner along the rotational axis (Y).

E9. The carbonator (100) according to embodiment E3 and embodiments E6 or E7, wherein the venting surface (86) comprises a first end surface (87) and a second end surface (88) with different configuration, wherein;

the configuration of the first end surface (87) is selected such that, when the actuator (46) is in contact with the first end surface (87), the valve body (44) is forced by the actuator (46) to set the venting valve (40) in an open state and;

the configuration of the second end surface (88) is selected such that when the actuator (46) is in contact with the second end surface (88), the valve body (44) sets the venting valve (40) is in the closed position.

E10. The carbonator (100) according to embodiment E4 and embodiment s E6 or E7, wherein the CO2-surface (90) is arranged to:

move towards the actuator (13) of the CO2-valve (12) such that the actuator (13) is forced to extend into the connector (11) thereby setting the CO2-valve (12) an open state and;

move away from the actuator (13) such that the actuator (13) is withdrawn in or from the connector (11) thereby setting the CO2-valve (12) in a closed state.

E11. The carbonator (100) according to any one of embodiments E6-E10, wherein the configuration of the venting surface (86) and the configuration of the CO2-surface are selected with respect to each other such that the venting valve (40) and the CO2-valve (12) simultaneous are in closed state during a portion of rotational movement of the bridge (85).

E12. The carbonator (100) according to embodiment E5, wherein the manipulator (103) is a lever, wherein the operating mechanism (80) is configured to be:

in the start mode (I) during movement of the manipulator (103) in a first direction, over a first distance (a1);

in the intermediate mode (II) during movement of the manipulator (103) in a first direction, over a second distance (a2) and;

in the end mode (III) during movement of the manipulator (103) in a first direction, over a third distance (a3), wherein;

the length of the intermediate mode (II) is selected such that the intermediate mode (II) is recognizable by the person operating the manipulator (103).

E14. The carbonator (100) according to embodiment E5 or E12, wherein the manipulator (103) is connected to the bridge (85) via a rotational damper (84).

E15. The carbonator (100) according to any one of embodiments E1-E14, comprising a first over-pressure valve (60) arranged to relieve over-pressure in a beverage container (107), wherein said over pressure valve (60) comprises:

a sleeve (61) with a first end (61.1) connectable to the second connector (32) so that fluid may flow from the mouth (108) of a beverage container (107) in the second connector (32) into the first end (61.1) of said over-pressure valve (60) and;

said sleeve (61) having a second end (61.4) with an opening (64.5), and;

a fluid conduit connector (67) arranged within the sleeve (61) and partially extending out through said opening (64.5), and;

a movable valve body (63) with a fluid channel (63.1) arranged within the sleeve (61) and supported against the fluid conduit connector (67) by a compressible biasing element (65), and;

an adjustment ring (68), turnable arranged on the second end (61.4) of the sleeve (61), wherein;

the adjustment ring (68) engages the fluid conduit connector (67) such that turning of the adjustment ring (68) moves the fluid conduit connector (67) towards or away from the valve body (63) and thereby causes the biasing element (65) to expand or compress.

E16. The carbonator (100) according to any one of embodiments E1-E15 comprising a CO2-head (10) with the first connector (11) for a gas-outlet (105) of a CO2-container (104) and with the CO2-valve (12), and;

a dissolver head (30) with the second connector (32) for a mouth (108) of a beverage container (107) and with the dissolver nozzle (31) for introducing CO2-gas into the beverage container (107), connected to the CO2-valve (12) and wherein;

the venting valve (40) is arranged in the CO2-head (10) and wherein;

the operating mechanism (80) is arranged in the CO2-head (10).

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms “comprise/comprises” or “include/includes” do not exclude the presence of other elements or steps. Furthermore, although individual features may be included in different claims (or embodiments), these may possibly advantageously be combined, and the inclusion of different claims (or embodiments) does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A carbonator for producing carbonated beverage comprising:

a first connector, for a gas-outlet of a CO2-container, and with a CO2-valve operable between a closed state and an open state in which CO2-gas may be introduced from the gas-outlet of the CO2-container into the CO2-valve;

a second connector, for a mouth of a beverage container, and with a dissolver nozzle, for introducing CO2-gas into the beverage container, connected to the CO2-valve;

a venting valve connected to the second connector and operable between a closed state and an open state in which excess CO2-gas may be led out from the beverage container through the venting valve;

an operating mechanism configured to operate the CO2-valve and the venting valve between open and closed states; and a manipulator, coupled to the operating mechanism, for allowing a person to operate the operating mechanism between:

a start mode in which the venting valve is open and the CO2-valve is closed, and an end mode in which the CO2-valve is open and the venting valve is closed, wherein the operating mechanism is configured to be set in an intermediate mode, between the start mode and the end mode in which both the venting valve and the CO2-valve are closed.

2. The carbonator according to claim 1, wherein the operating mechanism is configured to be set in the intermediate mode, and wherein a duration of the intermediate mode is longer than a duration of the start mode.

3. The carbonator according to claim 1, wherein the venting valve comprises a sleeve with a movable valve body and an actuator arranged to be moved axially in the sleeve by the operating mechanism towards the valve body to set the venting valve in the open state.

4. The carbonator according to claim 1, wherein the CO2-valve comprises a sleeve with an actuator, wherein the actuator is arranged to be moved axially in the sleeve by the operating mechanism into the first connector thereby setting the CO2-valve in the open state.

5. The carbonator according to claim 1, wherein the operating mechanism comprises a bridge that is rotationally journalled in the carbonator and connected to the manipulator such that the bridge may be rotated by the manipulator around a rotational axis extending through the bridge and through the manipulator.

6. The carbonator according to claim 1, wherein the venting valve comprises a sleeve with a movable valve body and an actuator arranged to be moved axially in the sleeve by the operating mechanism towards the valve body to set the venting valve in the open state, wherein the operating mechanism comprises a bridge that is rotationally journalled in the carbonator and connected to the manipulator such that the bridge may be rotated by the manipulator around a rotational axis (Y) extending through the bridge and through the manipulator, and wherein the bridge comprises a venting surface which is in contact with the actuator of the venting valve and a CO2-surface which is in contact with the actuator of the CO2-valve.

7. The carbonator according to claim 6, wherein the operating mechanism is arranged such that rotational movement of the operating mechanism in a first direction displaces the venting surface and the CO2-surface relative to the actuator of the venting valve and the actuator of the CO2-valve such that the venting surface forces the actuator to set the venting valve in the open state and the CO2-surface forces the actuator to set the CO2-valve in the open state, and vice versa.

8. The carbonator according to claim 6, wherein the operating mechanism is configured to be set in the intermediate mode, and wherein a duration of the intermediate mode is longer than a duration of the start mode.

9. The carbonator according to claim 6, wherein the CO2-valve comprises a sleeve with an actuator, wherein the actuator is arranged to be moved axially in the sleeve by the operating mechanism into the first connector thereby setting the CO2-valve in the open state.

10. The carbonator according to claim 6, wherein the venting surface and the CO2-surface are oriented in a side-by-side manner along the rotational axis.

11. The carbonator according to claim 6, wherein the venting surface comprises a first end surface and a second end surface with different configuration, wherein:

the configuration of the first end surface is selected such that, when the actuator is in contact with the first end surface, the valve body is forced by the actuator to set the venting valve in the open state, and the configuration of the second end surface is selected such that when the actuator is in contact with the second end surface, the valve body sets the venting valve in the closed state.

12. The carbonator according to claim 6, wherein the CO2-surface is arranged to:

move towards the actuator of the CO2-valve such that the actuator is forced to extend into the first connector thereby setting the CO2-valve in the open state and;

move away from the actuator such that the actuator is withdrawn from the first connector thereby setting the CO2-valve in the closed state.

13. The carbonator according to claim 6, wherein the configuration of the venting surface and the configuration of the CO2-surface are selected with respect to each other such that the venting valve and the CO2-valve simultaneously are in the closed states during a portion of rotational movement of the bridge.

14. The carbonator according to claim 5, wherein the manipulator is a lever, and wherein the operating mechanism is configured to be:

in the start mode during movement of the manipulator in a first direction, over a first distance;

in the intermediate mode during movement of the manipulator in the first direction, over a second distance and;

in the end mode during movement of the manipulator in the first direction, over a third distance, wherein;

a length of the intermediate mode is selected such that the intermediate mode is recognizable by the person operating the manipulator.

15. The carbonator according to claim 5, wherein the manipulator is connected to the bridge via a rotational damper.

16. The carbonator according to claim 1, further comprising a first over-pressure valve arranged to relieve over-pressure in the beverage container, wherein the first over-pressure valve comprises:

a sleeve with a first end connectable to the second connector so that fluid may flow from the mouth of the beverage container in the second connector into the first end;

said sleeve having a second end with an opening;

a fluid conduit connector arranged within the sleeve and partially extending out through said opening;

a movable valve body with a fluid channel arranged within the sleeve and supported against the fluid conduit connector by a compressible biasing element; and an adjustment ring, turnable and arranged on the second end of the sleeve, wherein the adjustment ring engages the fluid conduit connector such that turning of the adjustment ring moves the fluid conduit connector towards or away from the valve body and thereby causes the biasing element to expand or compress.

17. The carbonator according to claim 1, further comprising:

a CO2-head with the first connector for the gas-outlet of the CO2-container and with the CO2-valve; and a dissolver head with the second connector for the mouth of the beverage container and with the dissolver nozzle for introducing CO2-gas into the beverage container, connected to the CO2-valve, wherein the venting valve is arranged in the CO2-head, and wherein the operating mechanism is arranged in the CO2-head.

* * * * *